N. C. DEAN.

Clip-Plates for Carriage-Springs.

No. 5,490. Reissued July 15, 1873.

Witnesses.
Chas. B. Stub
Ph. C. Keasi.

Inventor.
Norman C. Dean
Chipman & Somers & Co
attys

AM. PHOTO-LITHOGRAPHIC CO. N.Y. (OSBORNE'S PROCESS)

UNITED STATES PATENT OFFICE.

NORMAN C. DEAN, OF UNION SPRINGS, NEW YORK, ASSIGNOR OF ONE-HALF INTEREST TO SILAS S. BLISS, OF SAME PLACE.

IMPROVEMENT IN CLIP-PLATES FOR CARRIAGE-SPRINGS.

Specification forming part of Letters Patent No. 134,859, dated January 14, 1873; reissue No. 5,490, dated July 15, 1873; application filed May 17, 1873.

*To all whom it may concern:*

Be it known that I, NORMAN C. DEAN, of Union Springs, in the county of Cayuga and State of New York, have invented a new and valuable Improvement in Spring-Plates; and I do hereby declare that the following is a full, clear, and exact description of the construction and operation of the same, reference being had to the annexed drawings making a part of this specification and to the letters and figures of reference marked thereon.

Figure 1:
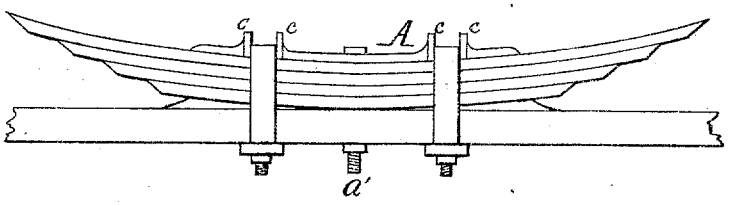
Figure 2:
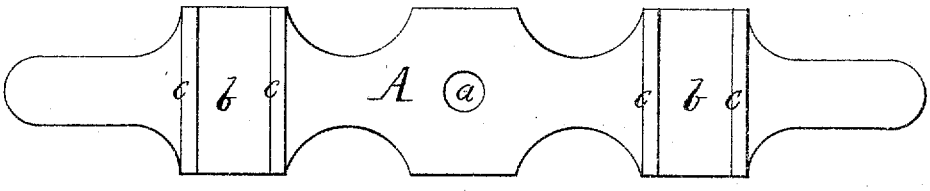
Figure 3:
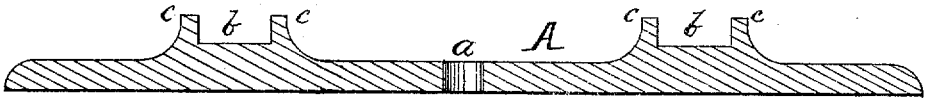

Figure 1 of the drawings is a representation of a front view of my invention. Fig. 2 is a top view, and Fig. 3 is a central vertical longitudinal section of the same.

This invention has relation to fastenings for elliptic carriage or wagon springs; and it consists in the novel construction of a metallic plate casting, which is transversely channeled or flanged and provided with a central vertical opening, and which is secured on the upper side of the top leaf of the springs, to receive the spring-clips and prevent them from being displaced or affected by lateral strain.

In the accompanying drawings, the letter A designates such a casting, having a hole, *a*, through the center to receive the bolt *a'*, which secures it to the axle. *b b* designate transverse channels, formed and bounded by the flanges *c c*. The plate A is arranged lengthwise of the springs, and is secured to the axle by the bolt *a'* passing through the central hole *a*, and receives the clips *e*, which secure the spring to the axle or block, thereby strengthening the same and preventing lateral displacement. The clips *e* are located in the channels *b* of the plate, and, being embraced by the flanges *c*, are prevented from being laterally moved or displaced by the working of said springs.

What I claim as my invention, and desire to secure by Letters Patent, is—

The metallic plate A, constructed as herein described, having the central vertical hole *a*, parallel transverse flanges *c*, and re-enforced channels *b*, adapted to receive the spring-clips, substantially as and for the purpose set forth.

In testimony that I claim the above I have hereunto subscribed my name in the presence of two witnesses.

NORMAN C. DEAN.

Attest:
S. WARREN ROGERS,
I. L. HAMMOND.